United States Patent [19]

Mohr

[11] E Re. 29,479

[45] Reissued Nov. 22, 1977

[54] TENNIS BALL PITCHING APPARATUS WITH ANTI-JAMMING BALL FEED MECHANISM

[76] Inventor: Joseph J. Mohr, 1200 Cardiff Drive, Encinitas, Calif. 92024

[21] Appl. No.: 712,097

[22] Filed: Aug. 5, 1976

Related U.S. Patent Documents

Reissue of:

[64] Patent No.: 3,844,267
Issued: Oct. 29, 1974
Appl. No.: 357,907
Filed: May 7, 1973

U.S. Applications:

[63] Continuation-in-part of Ser. No. 133,070, April 12, 1971, abandoned.

[51] Int. Cl.[2] ..... F41B 15/00

[52] U.S. Cl. ..... 124/1; 124/51 R; 124/49

[58] Field of Search ..... 124/1, 50, 41 R, 78, 124/80, 9; 273/26 D; 221/203, 202; 222/240; 64/29, 30 E, 30 R

[56] References Cited

U.S. PATENT DOCUMENTS

| | | | |
|---|---|---|---|
| 808,856 | 1/1906 | Melton | 222/240 X |
| 2,716,973 | 9/1955 | Desi | 124/78 |
| 3,298,569 | 1/1967 | Weitzman | 221/203 |
| 3,421,491 | 1/1969 | Brown | 124/9 |

FOREIGN PATENT DOCUMENTS

| | | | |
|---|---|---|---|
| 1,039,105 | 8/1966 | United Kingdom | 124/78 |

*Primary Examiner*—Richard C. Pinkham
*Assistant Examiner*—William R. Browne
*Attorney, Agent, or Firm*—Brown & Martin

[57] ABSTRACT

Apparatus for propelling tennis balls at timed intervals from a storage hopper. The hopper has the configuration of an inverted truncated cone. At the base of the cone and in a position to receive balls from the cone, is a rotating ball selector. The ball selector is driven through a clutch which disengages at a predetermined torque. Upon disengagement, the clutch permits the drive to rotate for approximately one-half revolution without transmitting any torque to the ball selector, and then induces a partial counter-rotation or reverse motion of the ball selector by the action of a spring loaded pin engaging an inclined face on a clutch cam.

7 Claims, 12 Drawing Figures

TENNIS BALL PITCHING APPARATUS WITH ANTI-JAMMING BALL FEED MECHANISM

Matter enclosed in heavy brackets [ ] appears in the original patent but forms no part of this reissue specification; matter printed in italics indicates the additions made by reissue.

*CROSS REFERENCE TO RELATED APPLICATION*

*This application is a continuation-in-part of an application entitled Tennis Ball Pitching Machine, Ser. No. 133,070, filed Apr. 12, 1971, now abandoned.*

BACKGROUND OF THE INVENTION

Various devices have been proposed or built which are utilized to propel balls, such as tennis balls, automatically. With specific reference to tennis ball pitching machines, the proposed devices have been utilized in practicing for proficiency in the game of tennis. The player positions himself on the court opposite the machine and then returns the balls pitched by the machine as an aid acquiring tennis skills.

However, previously provided tennis ball pitching machines have not provided for the delivery of consistent velocity, proper trajectory, pitched balls, and further, are susceptible to jamming to an extent that their use without an assistant or instructor to continually relieve the jamming of the balls and permit the machine to continue to deliver balls has been impractical.

It has been recognized that to achieve full utilization, a tennis ball pitching machine should provide a means for varying the aim point or delivery point of the pitched ball. For this purpose, prior art machines have provided a means of oscillating the pitching machine about a vertical axis. However, in prior art devices, the means for oscillating the machines has been related in speed to the ball delivery apparatus, such that a tennis ball is propelled in a predictable pattern of delivery points, and therefore the user does not obtain the maximum training effect as would be obtained with a random delivery pattern.

Thus it is desirable to have a tennis ball pitching machine which consistently delivers balls at the same velocity, which has a reduced susceptibility to jamming, and which includes a device for automatically clearing jams and continuing the tennis ball pitching action. Such a device is particularly to be desired where it provides for a delivery of balls in a substantially randomly distributed angular pattern of delivery points.

SUMMARY OF THE INVENTION

In an exemplary embodiment of the invention, an inverted truncated conically configured ball storage hopper is utilized. The balls are fed, under the influence of gravity, into a rotating selector body of substantially cylindrical configuration. The selector body has a plurality of apertures around its periphery. These apertures are sized to be the maximum which will permit the entry of one ball, but exclude the entry of a second ball. Thus, as the selector rotates, a ball will drop under the influence of gravity into the aperture.

A delivery hole is provided at a point on the cover plate under the ball selector whereby a ball falling into the selector aperture will be rotated to, and fall through, the delivery hole into a delivery corridor.

Subsequent to the positioning of the ball in the delivery corridor way, an ejector arm, mounted for rotation with the ball selector, engages the selected ball in the corridor way and forces it, by a camming action, to be delivered to an acceleration corridor between dual belt courses of the ball acceleration and release apparatus.

The dual belt courses are maintained by dual, motor-driven, drive pulleys and idler pulleys. In addition, along each of the parallel belt courses, between the drive pulleys and idler pulleys, a plurality of ball compression rollers are employed. The spacing between the parallel courses is such that a tennis ball is slightly compressed, and thereby firmly gripped during the acceleration, and until release.

A base plate under the pulleys forms the floor of the acceleration corridor, and also is a support or frame for the machine which receives the support pedestal. The base plate is mounted for adjustable inclination on the support pedestal to vary the trajectory of the propelled balls. Further, pivoting about a vertical axis is provided. The pivoting motion is controlled by an oscillation means for inducing relative oscillation about the vertical axis, and including an adjustable crank arm secured to a pivot link. Rotary power for the oscillation means is provided by a separate gear motor, from the motors utilized driving the selector. The motors are not syncronous and the oscillation period is selected to avoid multiples of the nominal ball delivery period, whereby delivery of balls at random angulation from a nominal center line delivery point is obtained.

The ball selector is driven through an anti-jam clutch which includes a spring loaded pin, engaging a notch in the surface of a clutch arm. The pin is secured through a clutch body to one shaft, and the clutch cam secured to the opposite shaft. Spring pressure normally holds the cooperative sloping pin and cam faces in contact, thus continuing the ball selector drive action. However, should a jam or other interference result in a predetermined maximum torque delivered to the clutch, then the cam drive pin will be biased up the sloping clutch cam drive face, and will therefore disengage the driving action. The pin then rides on the exterior circumference of the clutch drive face, for substantially one half revolution. Upon completion of the half revolution, the cam drive pin will encounter a second clutch cam notch, and will begin to engage a reverse motion drive face. The radial spring bias motion of the cam drive pin, acting on the inclined reverse motion drive face, results in a partial counter-rotation or reversing of the selector, thereby relieving the jam of balls which may be obstructing the delivery hole or aperture. Subsequently, upon the cam drive pin being spring biased to the bottom of the clutch cam notch, the clutch will again become engaged with the drive pin, engaging the second clutch cam drive face, and continuing the rotation in the normal direction, whereby the ball delivery action will continue.

The occurrence of jams is reduced by a selector shaft, protruding from the top of the ball selector and into the hopper. The selector shaft has a plurality of vertically spaced agitator pins that are effective to "stir" the stored balls and prevent vaulting or other jams in the hopper. An additional agitator pin is secured to the top face of the ball selector at substantially a 45 degree angle. During the rotation of the selector, this agitator pin imparts a vertical churning action. By the combined action of the agitator pins substantial movement is induced in the stored balls reducing jam-ups and resulting in a ball being regularly available for delivery to the apertures in the ball selector body.

It is thereby an object of the invention to provide a new and improved tennis ball pitching apparatus.

It is another object of the invention to provide a new and improved tennis ball pitching apparatus which produces a consistently accurate and equal velocity pitching action.

It is another object of the invention to provide a new and improved tennis ball pitching apparatus which is reliable and requires little operator attention.

It is another object of the invention to provide a new and improved tennis ball pitching apparatus with improved anti-jam configuration.

It is another object of the invention to provide a new and improved tennis ball pitching apparatus with a mechanism for eliminating jams when they occur.

Other objects and many attendant advantages of the invention will become more apparent upon a reading of the following detailed description and by reference to the drawings in which like reference numerals refer to like parts throughout and in which.

Figure 1:
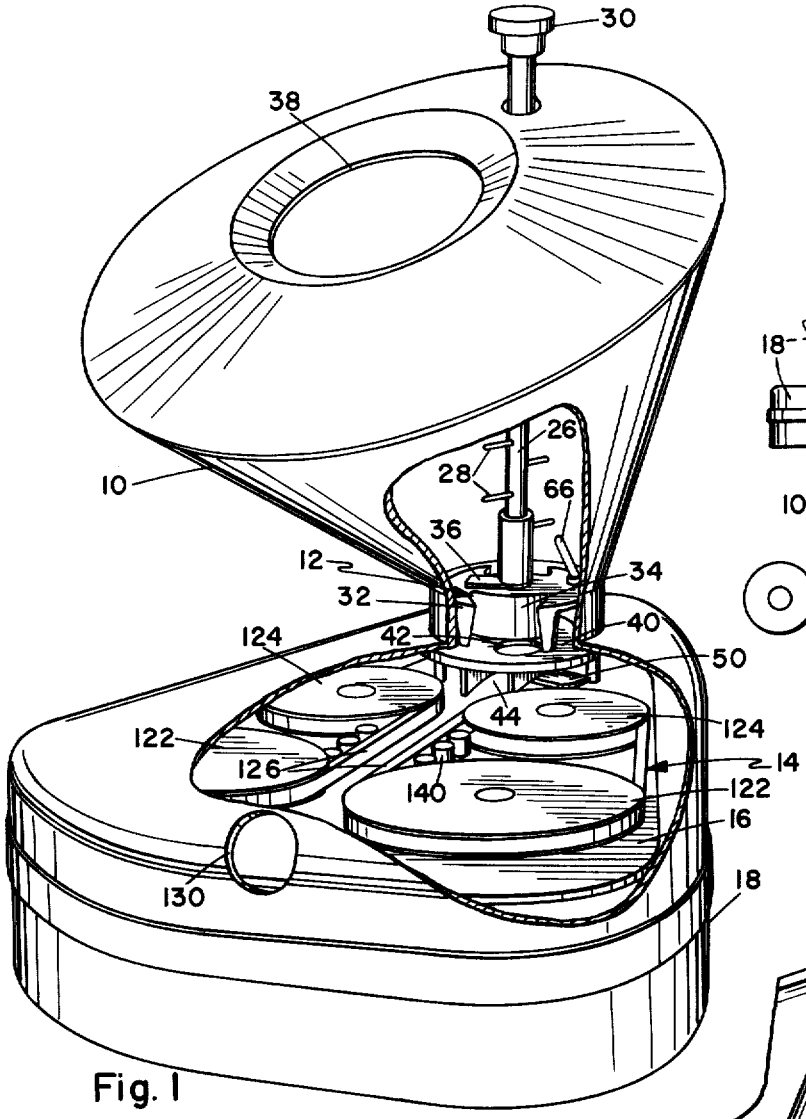
FIG. 1 is a perspective view of the complete tennis ball pitching apparatus with portions of the housing and hopper cut away.

Referring now to the drawings, there is illustrated a ball hopper 10 having an inverted conical configuration, and having a ball selector 12 rotatably mounted at the lower truncated end of the conical configuration. The ball selector 12 delivers balls to a ball acceleration and release apparatus 14 mounted on base plate 16. The entire mechanism is enclosed in a housing 18. On the underside of the base plate 16 there is an oscillation mechanism 20. The apparatus is carried on a support base 22.

Figure 2:
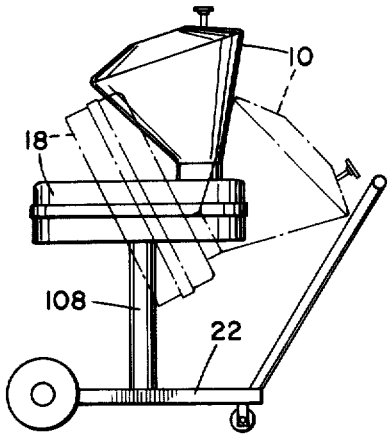
FIG. 2 is a side elevation view of the apparatus on a reduced scale mounted on a support base.

The hopper configuration permits the loading of balls through a hopper opening 38 which is of sufficient size to permit easy loading of balls and yet to prevent the loss of balls during tilting movements of the apparatus as is illustrated in FIG. 2. The loaded balls are kept in a state of agitation by the rotation of a selector shaft 26 which includes a plurality of agitator pins 28. A handle 30 on the end of the selector shaft 26 permits manual rotation and is utilized to operate an aperture shutter 36 in a manner to be described more fully hereinafter.

The selector 12 comprises a selector body 32 having an agitator pin 66 mounted at a 45 degree inclination from the vertical on the upper surface of the selector body 32. Two diametrically opposed ball delivery apertures 34 are provided through the selector body 32. These apertures are located at the periphery of the body, and extend axially therethrough. The circumferential extent of the holes is such that there is a maximum space for permitting a single ball to drop into the hole, but insufficient space for two balls to be received.

Rotation of the selector body results in one of the agitated balls in the storage hopper being delivered through an aperture 34 to a delivery opening 42 in cover plate 40. The delivery opening 42 is positioned directly above a curved delivery corridor 44. Delivery corridor 44 comprises walls 46 and 48 which terminate in the immediate proximity of the ball acceleration and release apparatus 14. An ejector arm 50 having a curved camming face 58, drives the balls down the delivery corridor and into engagement with the ball acceleration and release apparatus 14. The ejector arm 50 is out of phase with the apertures in the selector body 32. Therefore a ball dropping through the delivery opening 42 remains at rest until the delivery opening is closed by the selector body, thereby preventing jamming or an attempted delivery of more than one ball at a time.

A shutter 36 is mounted for rotation on the upper surface of the selector body 32. The selector shaft 26 is released from engagement with the selector body by a combined depression and rotation with a latching device (not shown). The relative rotation between the selector shaft causes the shutter 36 to be positioned over one of the apertures 34, thereby reducing the delivery rate of the balls by one half.

Figure 6:
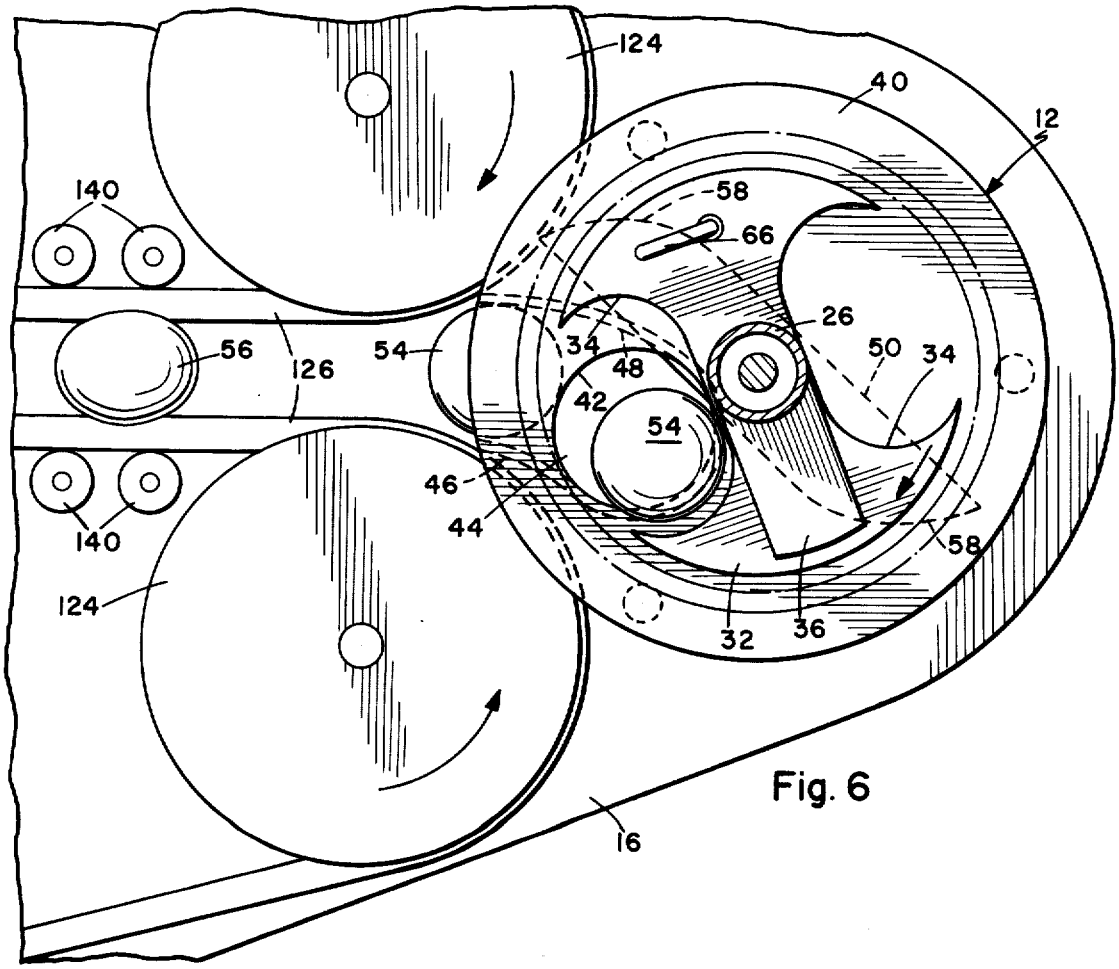
FIG. 6 is a top plan view of the mechanism of FIG. 5.

FIG. 6 illustrates a plurality of balls 54 in various stages of delivery from the hopper 10 through the apertures 34 and into the delivery corridor 44. An additional ball 56 is illustrated as being compressed between the belts 126 of the acceleration and delivery apparatus. The acceleration and release apparatus includes drive pulleys 124 and idler pulleys 122 which produce a parallel course of the belt 126 forming an acceleration corridor with the top of the base plate 16. A steady compression and therefore a steady acceleration and delivery of the balls is insured by a plurality of ball compression rollers 140 spaced between the idler and drive pulleys. Separate drive motors 120 for the acceleration and release apparatus 14 are secured to the underside of base plate 16. A ball is released and projected from the acceleration and release apparatus 14 as the ball reaches the drive pulleys 124 and passes beyond the point where the belts 126 begin to conform to the circumference of the drive pulleys 124. At this point the ball is projected through the ball release opening 130 in housing 18.

Figure 7:
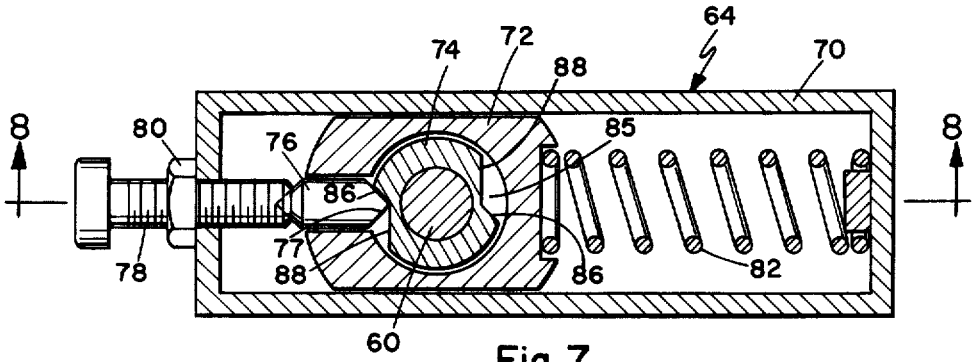
FIG. 7 is an enlarged sectional view taken on line 7—7 of FIG. 5.
Figure 8:
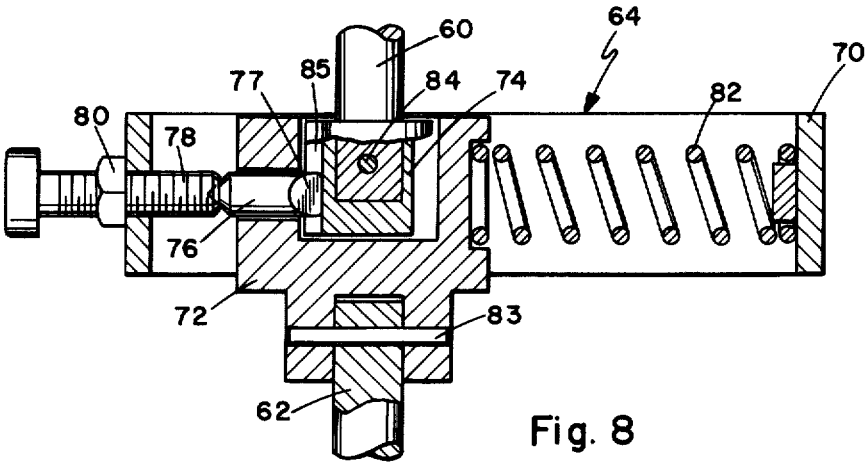
FIG. 8 is a sectional view taken on line 8—8 of FIG. 7.

The selector 12 is powered by a selector drive motor 61 which transmits power through output shaft 62 by pin 83 to a selector clutch 64. The clutch mechanism illustrated in detail in FIGS. 7 and 8, includes a clutch housing 70 slidably secured over a clutch body 72. The clutch body 72 receives, for relative rotation, a clutch cam 74. In normal operation a cam drive pin 76 maintains the clutch cam 74 and clutch body in engagement so that the parts rotate together. The cam drive pin 76 includes a wedge shaped cam engaging surface 77 which engages, during normal operation, the cam drive face 86 of one of two cam notches 85. Reverse motion after disengagement of the clutch 64 is obtained by spring radial bias from spring 82 causing the cam drive pin 76 to engage the reverse motion drive face 88 in a manner which will be described in greater detail hereinafter. The reverse motion drive face is cut at a smaller angle with the clutch cam circumference to produce a relatively large reverse rotation. Adjustment of the clutch disengaging torque is obtained through a clutch tension adjustment screw 78 locked in position by lock nut 80. A pin 84 connects the clutch cam 74 to the selector drive shaft 60.

Figure 4:
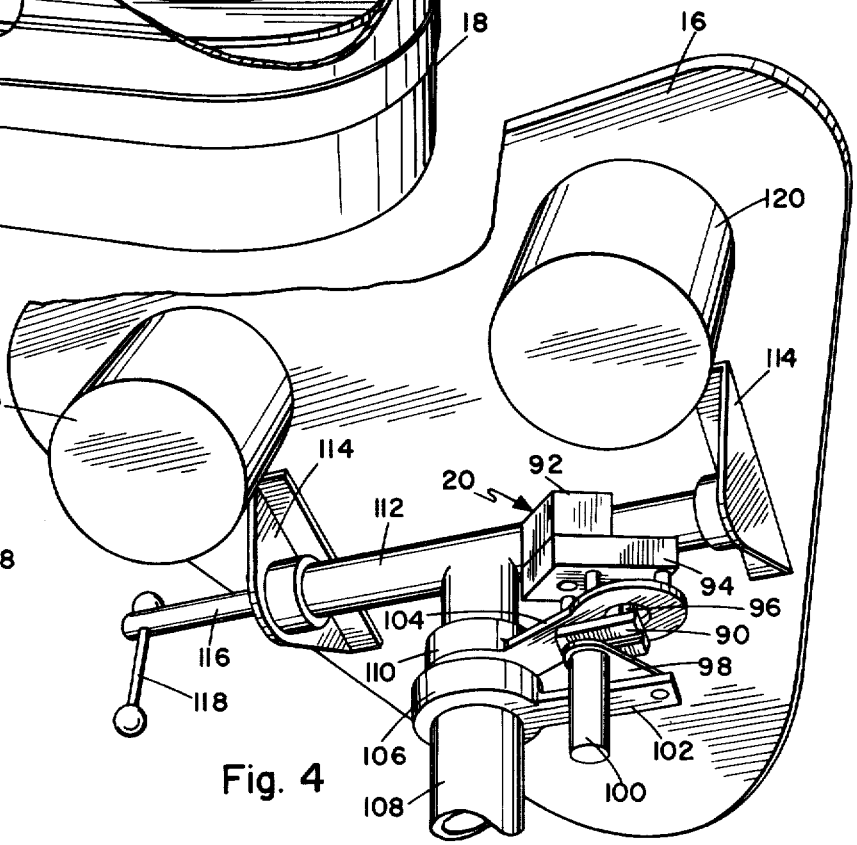
FIG. 4 is an enlarged perspective view from below of the oscillating mechanism.
Figure 5:
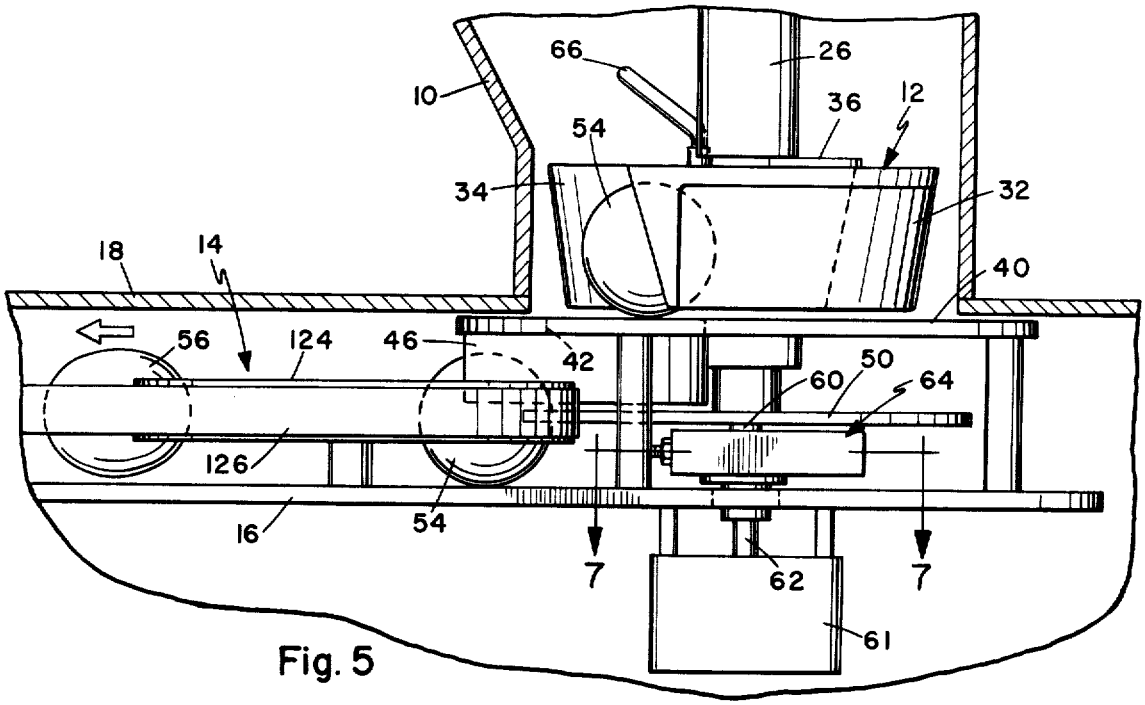
FIG. 5 is an enlarged side elevation view of the ball selector and delivery mechanism with portions of the housing and hopper indicated in section.

The tilting movement through the range illustrated in FIG. 2 is provided by an inclination apparatus illustrated in FIG. 4. The apparatus includes an inclination pivot 112 secured by inclination pivot brackets 114 to the undersurface of the base plate 16. An adjustment arm 116 controlled by handle 118 locks the apparatus at any selected inclination. The apparatus is mounted for rotation about the vertical axis on a support pedestal 108 and an oscillation apparatus 20 between the apparatus of vertical support 109 and the support pedestal 108. The motor 92 including gear box 94 is supported on a bracket 104 secured to support collar 110 on vertical support 109. A corresponding support bracket 102 extending from a collar 106 on pedestal 108 carries pivot link 98. Motor output shaft 96 is secured to one end of an adjustable stroke crank 90. The stroke of the crank is adjustable through crank adjustment handle 100 which secures the bearing point for pivot link 98 at a selected distance from the axis of output shaft 96.

OPERATION

In use, the hopper 10 is filled with a plurality of tennis balls. In the exemplary embodiment of the invention, as many as 320 tennis balls may be loaded into the hopper. The conical configuration of the hopper funnels the balls into contact with the upper surface of the selector body 32 so that when the selector body rotates, a ball will be induced by gravity to drop into the apertures 34. Any tendency for the balls to produce a vaulting jam, or otherwise to produce a jam that would prevent gravity from delivering balls to the apertures 34 is prevented by the action of agitator pins 28 which continually stir the balls during the rotation of the selector 12. Further anti-jamming action is provided by the agitator pin 66 on the upper surface of the selector body 32. The inclination of pin 66 produces a vertical agitation of the balls and prevents jamming in the immediate vicinity of the selector body 32.

A ball passing into aperture 34 is dropped through the delivery hole 42 into the delivery corridor 44. Only one ball may pass into this corridor, since the aperture 42 is closed by the rotation of the selector body 32 prior to action of ejector arm 50 in driving the ball into the acceleration and release apparatus 14. The curved face 58 of the ejector arm 50 and the curved delivery corridor results in a smooth and positive delivery of the ball to the acceleration and release apparatus. The belts 126 of that apparatus grasp the ball and compress it as is illustrated in the instance of ball 56 in FIG. 6. This compression of the ball insures a rapid acceleration and positive delivery. Compression is maintained over the length of the acceleration corridor by ball compression rollers 140.

The rate of ball delivery may be varied by turning the shutter 36 to bar entry to one of the apertures 34 and thereby reduce the delivery rate by one half.

Figure 3:
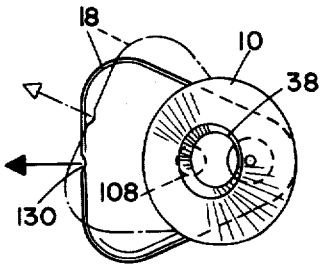
FIG. 3 is a top plan view of the apparatus as in FIG. 2 illustrating the oscillating action.

The player adjusts the inclination of the base plate by the rotation and securing of the inclination adjustment shaft 116 through handle 118. This inclination, in combination with the trajectory of the balls at the delivered speed, determines the approximate impact zone for the ball at the opposite end of a tennis court. After this adjustment, the player determines the amount of oscillation or variation in the impact point which he desires. Maximum oscillation is illustrated in FIG. 3 and is obtained by adjusting the crank adjustment handle to the extreme end of adjustable stroke crank 90. Since the gear motor 92 is independent of the selector drive motor 61 and their speeds are selected to avoid even multiples, there is a substantially random delivery of balls across the maximum arc of oscillation selected. This results in the device delivering a ball at differing angulations to the player, and requires him to address the ball in a manner closely approximating that in actual play.

Figures 9A, 9B, 9C, 9D:
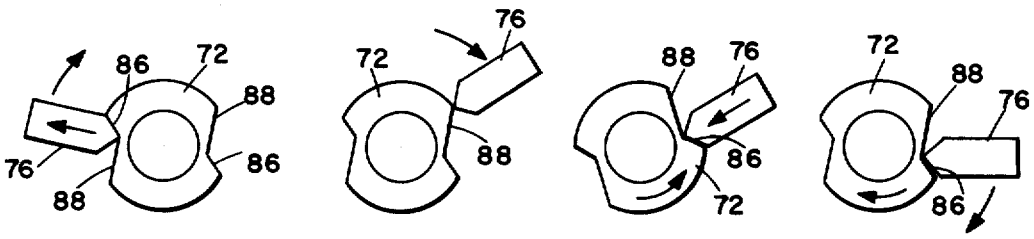
FIGS. 9a through 9d illustrate the stages of clutching action.

If, during the operation of the device, a ball should become jammed between any of the moving parts in the apparatus, then the torque limit of clutch 64 will be exceeded. The torque limit is determined adjustably by the tension adjustment screw 78 working in conjunction with the tension spring 82. When the torque limit is reached, the cam drive pin 76 will be forced along the clutch cam drive face 86 radially outwardly until it reaches the periphery of the clutch cam. Since there is no driving notch in which the pin can engage for a portion of the outer periphery, there is relatively free motion. Thus there is no driving action of the cam drive pin between the positions illustrated in FIGS. 9a and 9b. However, upon reaching the reverse motion drive face of the subsequent cam notch, the cam drive pin 76 will be forced along the reverse motion drive face 88 by the action of the spring 82. This action will result in the reverse motion as illustrated in FIG. 9c, and will be transmitted to the selector drive to produce a partial counter-rotation of the selector body 32. This counter-rotating action has the effect of freeing the jam, and allowing the selector body a second opportunity at delivering the ball through the delivery hole and into the acceleration and release apparatus 14. With the jam relieved, the drive pin 17 will proceed into engagement with the second clutch cam drive face 86 and produce rotation in the normal direction as is illustrated in FIG. 9d.

Having described my invention, I now claim:

1. Apparatus for propelling individual balls from a randomly arranged quantity of balls at pre-determined intervals, including a storage hopper and apparatus for accelerating and releasing the balls wherein the improvement comprises:

a ball selector connected to said storage hopper and comprising a substantially cylindrical body having at least one peripheral axial aperture of sufficient size to permit one of said balls to pass vertically through said aperture, drive means for rotating said selector, said selector being positioned above a ball delivery opening, said ball delivery opening communicating with a corridor comprising means for delivering said balls to said apparatus for accelerating and releasing balls, clutch means for disengaging said drive means from said ball selector at a predetermined torque, and for subsequently imparting a reverse rotation to said selector and re-engaging said drive means with said selector.

2. Apparatus according to claim 1 wherein:

said aperture has a circumferential size that is substantially greater than the diameter of a single ball and less than twice such diameter.

3. Apparatus according to claim 1, further including:

an ejector arm mounted for rotation with said selector, said ejector arm being mounted in the plane of said passage way, the long axis of said ejector arm being rotationally displaced from the angular orientation of said aperture.

4. Apparatus according to claim 1 and further including:

a selector shaft mounted for rotation with said selector and projecting within said hopper, said selector shaft having a plurality of spaced projections along at least a portion of its length.

5. Apparatus for propelling individual balls comprising:

a hopper for storing a quantity of balls, a rotating ball selector means for removing a single ball from said quantity of balls at periodic intervals, drive means for rotating said selector, and clutch means for disengaging said drive means from said ball selector means at a pre-determined torque, and for subsequently imparting a reverse rotation to said selector means and a re-engaging of said drive means with said selector means.

6. Apparatus according to claim 5 wherein:

said clutch means comprises a body portion secured for rotation with a first shaft, and a clutch cam portion secured for rotation with a second shaft, said clutch cam being substantially cylindrical and having at least one substantially V-shaped notch in said cylindrical surface, said body portion having a cam drive pin mounted for movement thereon, said cam drive pin being spring biased into said notch.

7. Apparatus according to claim 6 wherein:

said cam body portion is received within a clutch housing, and said cam drive pin is spring biased by a helical compression spring that bears against said housing at one end thereof and against said body portion at the opposite end.

* * * * *